Oct. 15, 1968  H. M. HAWKINS  3,406,220
REMOVAL OF A CHELATING AGENT FROM A PROCESS STREAM
Filed Jan. 11, 1966

INVENTOR
H. M. HAWKINS
BY
ATTORNEYS

United States Patent Office
3,406,220
Patented Oct. 15, 1968

3,406,220
REMOVAL OF A CHELATING AGENT FROM A PROCESS STREAM
Harold M. Hawkins, Bartlesville, Okla., assignor to Phillips Petroleum Company, a corporation of Delaware
Filed Jan. 11, 1966, Ser. No. 519,908
8 Claims. (Cl. 260—677)

ABSTRACT OF THE DISCLOSURE

A diketone chelating compound is removed from a product stream by contacting the stream with a trivalent metal compound capable of forming a solid chelate with said chelating compound in a dispersant, and filtering the dispersant to remove the chelate so formed.

---

Figures 1, 2:
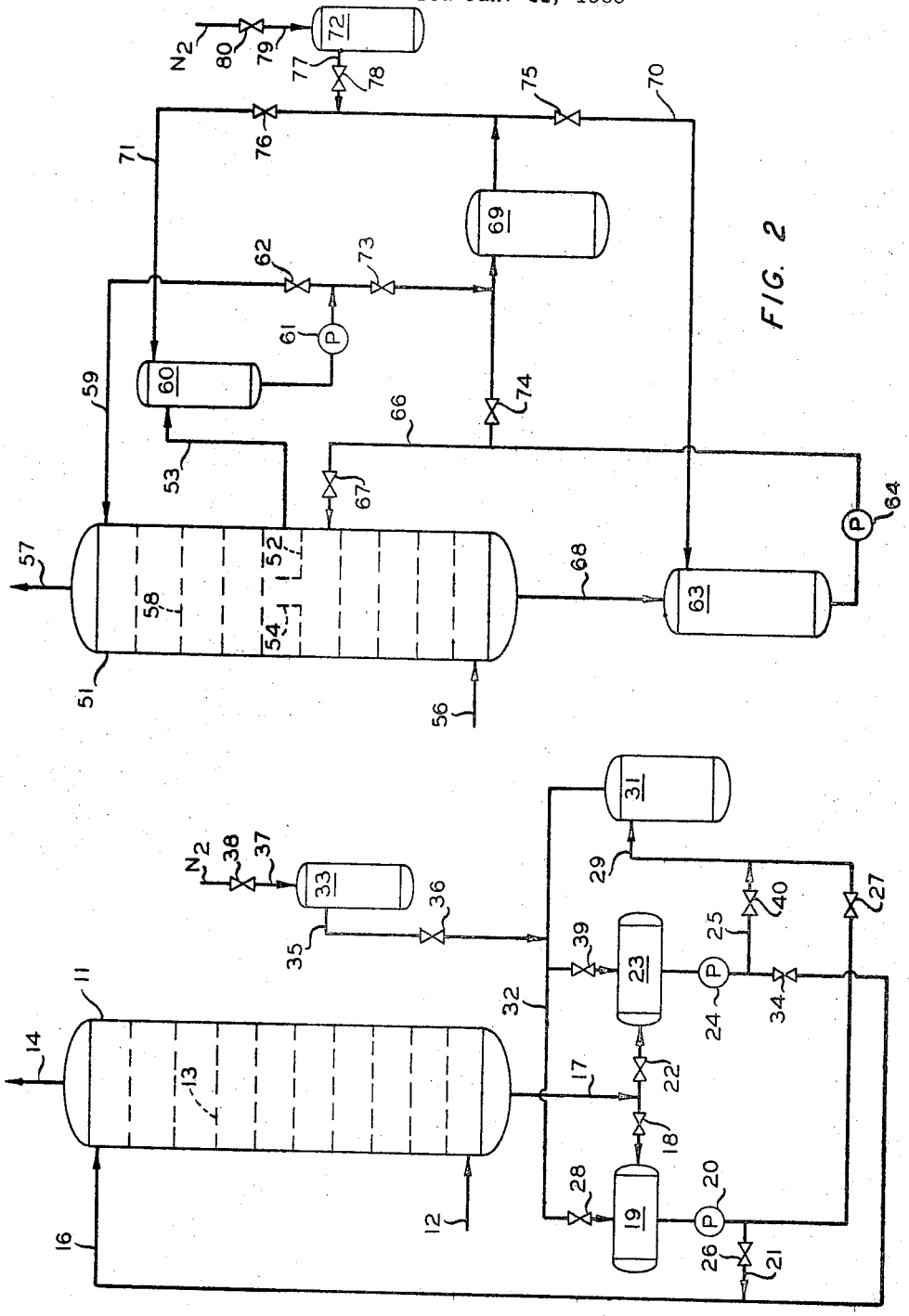

This invention relates to a method and an apparatus for removing a chelating agent from a process stream containing same. In one aspect, it relates to the removal of a chelating agent from a process stream by forming a solid chelate and filtering it out of the stream. In another aspect, it relates to a method of removing a diketone from a process stream by chelating it with a metal compound, and filttering out the resultant chelate. In another aspect, it relates to a method of removing acetylacetone from a propylene vapor stream by contacting it with an oil dispersion of a trivalent metal compound, and filtering out the resulting solid chelate. In another aspect, it relates to the recovery of acetylacetone by removing it from a process stream by chelation and filtration. In another aspect, it relates to the purification of a propylene vapor stream by removing the chelating agent present as an impurity by forming a solid chelate with that agent and filtering it out. In another aspect, it relates to an apparatus for contacting a process stream containing a chelating agent with an oil dispersion of a chelatable material and filtering out the resultant solid chelate.

While the method and apparatus of my invention are suitable for use in removing any chelating agent from a process stream, the preferred embodiment of my invention finds its greatest use in the removal of diketones, and particularly acetylacetone from propylene vapor streams.

In carrying out the polymerization of propylene in the presence of various metallic compound catalysts, a chelating agent such as acetylacetone is normally added to the reaction mixture as this mixture leaves the reaction zone for the purpose of deactivating the catalyst, converting metallic components of the catalyst to a soluble form, and removing such metallic residues from the solid polymer. Normally, an excess of chelating agents will be used, and the resulting polymer slurry will contain some excess free chelating agent. In the preferred embodiment of my invention, polymerization of propylene will have been carried out using only liquid propylene as the diluent, and the resulting polymer slurry after contacting with acetylacetone and other agents will comprise solid, particulate polypropylene dispersed in liquid propylene which contains free acetylacetone, chelated acetylacetone, other catalyst residues and small concentrations of soluble polypropylene. The preferred product, solid polypropylene, is separated from this propylene diluent by washing with clean propylene and is further processed as desired. Propylene is recovered from the contaminated propylene solution, including the wash propylene, by fractionation, leaving a concentrated mixture of soluble polypropylene, acetylacetone, chelated acetylacetone, and other catalyst residues in some propylene as a bottoms product from the fractionation. The remaining propylene can be recovered from this concentrated mixture by flashing it as a vapor from the mixture at a reduced pressure. This propylene vapor will contain some of the acetylacetone which volatilizes at the flashing conditions.

This acetylacetone must be removed before the propylene in which it is vaporized can be further processed so as to be reintroduced into the polymerization system, since the acetylacetone will condense out and plug lines, valves, and equipment as well as causing deactivation of catalyst if it were to reach the reactor.

It is, therefore, an object of my invention to remove a chelating agent from a stream containing the same. It is a further object of my invention to remove acetylacetone from propylene vapors. It is a further object of my invention to purify propylene by the removal of impurity diketones. It is a further object of my invention to recover chelating agents from a stream in which they are present in minor quantities.

These and other objects are attained by the practice of my invention which is the process of contacting a fluid stream containing a chelating agent with a dispersion of a metal compound capable of forming a chelate with the chelating agent, and separating the chelate so formed from the fluid stream. The chelate may subsequently be treated by known means to regenerate the chelating agent and the metal compound if desired. Apparatus for carrying out my invention comprises a gas-liquid contacting means combined with a recirculating means for continuously circulating the contacting liquid in the gas-liquid contact means and filtering means whereby the chelate formed may be removed from the contacting dispersion.

FIGURE 1 shows a preferred embodiment of my invention. FIGURE 2 shows another embodiment of my invention which provides for contacting the process stream with two partially separate stages of extraction.

A continuous process apparatus for the practice of my invention is shown in FIGURE 1. Propylene vapor which has been flashed from the polymerization process residue stream, and which contains a minor concentration of acetylacetone, is introduced into gas-liquid contact chamber 11 through line 12. The gas-liquid contact chamber is operated under conditions of temperature and pressure sufficient to maintain the propylene as a vapor phase. Inside chamber 11, the propylene vapor will rise upwardly through contacting plates 13, and will eventually emerge in a purified state through line 14. A dispersion of a trivalent metal compound, such as iron or aluminum hydroxide, capable of forming a chelate with acetylacetone, in oil is introduced through line 16. The liquid dispersion will travel downwardly over contact plates 13, removing the acetylacetone from the propylene vapor as it travels downwardly, and is taken out of the chamber through line 17. The dispersion will then pass through valve 18 into surge tank 19. It is continuously recirculated from surge tank 19 through pump 20 and lines 21 and 16 to the gas-liquid contact chamber. The dispersion is thus continuously circulated through the system for constant reuse in the gas-liquid contact chamber.

Duplicate recirculating apparatus comprising valve 22, surge tank 23, pump 24 and line 25 are provided for reasons which will become apparent.

When the dispersion of trivalent metal compound and oil has become exhausted through absorption of the maximum possible amount of acetylacetone, as determined by a continuous analyzer or by sampling and laboratory analysis, provision is made for filtering the solid acetylacetone-metal chelate out of the oil, and recharging the oil with fresh trivalent metal compound. To accomplish this, valve 26 is closed and valves 27 and 28 are opened, thus allowing the dispersion from surge tank 19 to be directed by pump 20 through line 29 and valve 27 to filtering apparatus 31, which may be any standard type of filter. The filtered oil returns through line 32 and valve 28 to surge tank 19. Fresh trivalent metal compound is added to the oil in line 32 from a concentrate in tank 33 via line 35 and valve 36. The concentrate in tank 33 is forced into line 32 under the pressure of compressed nitrogen applied to tank 33 via line 37 and valve 38.

The duplicate recirculating apparatus mentioned above, and comprising valves 22, 39 and 40, surge tank 23, pump 24 and line 25, is provided so that there will be no interruption in treatment of the propylene stream while the dispersion from surge tank 19 is being filtered. During the filtration as described above, all of the dispersion in surge tank 19 will be circulated through the filter, and the gas-liquid contact chamber will be supplied from the dispersion in surge tank 23 by opening valves 22 and 34 which will allow continuous circulation through the gas-liquid contact chamber in the same manner as described for surge tank 19 above. This apparatus therefore provides for continuous operation since the dispersion in one surge tank is being circulated through the gas-liquid contact chamber while the dispersion in the other surge tank is being filtered.

The embodiment shown in FIGURE 2 is generally similar to that shown in FIGURE 1, except that I pro- provide for two serial washings of the propylene vapor with two different portions of dispersion. In this embodiment, the gas-liquid contact chamber 51 is divided into two sections. Tray 52 in the middle of the tank allows passage of vapors upwardly from the lower section to the upper section of the chamber, but liquid that accumulates on tray 52 is removed through line 53 before it reaches the level of overflow weir 54. Liquid in the top of the chamber, therefore, is prevented from reaching the lower half of the chamber. Thus, vapors having been washed a first time in the lower chamber will be washed a second time with fresh dispersion in the upper half.

The vapor containing acetylacetone is introduced through line 56, and travels upwardly through the chamber, being removed as a purified stream of propylene through line 57. As the propylene travels upwardly, it is contacted by dispersion on contact plates 58. The dispersion of trivalent metal compound and oil is introduced to the upper half of the chamber through line 59, and travels downwardly through contact plates 58 to be collected on tray 52, and removed through line 53. The dispersion is collected at surge tank 60, and is pumped from the surge tank by pump 61 through valve 62 and line 59 to recirculate through the upper half of the gas-liquid contact chamber. The dispersion being used in the lower half of the gas-liquid contact chamber is stored in surge tank 63. It is pumped by pump 64 through line 66 and valve 67 into the upper portion of the lower half of the gas-liquid contact chamber. After traveling downward over contact plates 58, it is removed by line 68 and returned to surge tank 63.

As in the previously described embodiment, dispersion from either of the two surge tanks may be directed by proper valving to filter tank 69. The filtered oil is returned through either line 70 or 71 via valves 75 or 76 to the proper surge tank. The fresh trivalent metal compound is added to the filtered oil as a slurry in tank 72 via line 77 and valve 78 motivated by nitrogen pressure from line 79 and valve 80.

In the embodiment shown in FIGURE 2, there will be only one stage of washing when either one of the surge tanks is undergoing filtration. In general, this does not present a serious problem as the filtration time is short, and the amount of acetylacetone passing through the first stage of washing into the second is quite small. In general, the amount of acetylacetone which escapes from the first washing is insufficient to cause problems in the subsequent polymerization of the propylene, and may be ignored. For critical applications, however, it would require a very slight modification to convert this embodiment into a continuous process by allowing a certain portion of the dispersion to pass through valves 73 and/or 74 and into filter tank 69 continuously, thus providing a continual filtration of the dispersion. Automatic controls which are well known in the art could be used to insure proper delivery of concentrate from tank 72 to the filtered oil stream to maintain the desired concentration of trivalent metal compound in the dispersion and to maintain operating inventory of slurry in tanks 60 and 63, and perform other desirable regulation functions.

Although my invention has been described above in terms of a specific embodiment, it is obvious that it is generally applicable to the removal of any chelating agent from any vaporous product stream. The chelating material, although referred to above as a trivalent metal compound, can be any metal compound capable of forming a solid chelate with the particular chelating agent involved. Additionally, the dispersing agent is not limited to oil, but could be any suitable liquid which is not reactive with the various components present in the system for treating or in the chemical reaction system to which the purified process stream is returned. This agent is preferably nearly non-volatile at the conditions of operation.

The present invention is especially applicable to purification of effluent propylene vapor from a flash operation following catalyst deactivation in the propylene polymerization process, wherein acetylacetone is used as the catalyst chelating agent, although it may be applied to the appropriate effluent stream from the polymerization process of any olefin, wherein a diketone chelating agent needs to be removed. In general, the olefin polymerization process streams are those resulting from process steps in the homo- or co-polymerization of mono-1-olefins having no more than 8 carbon atoms per molecule and no branching nearer the double bond than the 4 position.

A wide variety of catalyst systems can be employed in such polymerizations, and my invention is not intended to be limited to any particular catalyst system. Any catalyst system which will subsequently form a chelate with a diketone may be used in the process of my invention.

A particularly suitable catalyst is one which comprises (a) a compound having the formula $R_nMX_m$, wherein R is an alkyl, cycloalkyl or aryl radical or combinations of these radicals, such as alkaryl, aralkyl and alkylcycloalkyl, X is hydrogen or a halogen, including chlorine, bromine, iodine and fluorine, M is aluminum, gallium, indium or thallium, $n$ is from 1 to 3, inclusive, $m$ is from zero to 2, inclusive, and the sum of $m$ and $n$ is equal to the valence of the metal M, and (b) a halide of a metal of Group IV-B, V-B, VI-B or VIII. The hydrocarbon radicals which can be substituted for R in the aforementioned formula include radicals having up to about 20 carbon atoms each. Radicals having 10 carbon atoms or less are preferred since the resulting catalyst composition has a greater activity for initiating the propagating polymerization.

Examples of compounds corresponding to the formula $R_nMX_m$ which can be employed include trimethylaluminum, triethylaluminum, triisobutylaluminum, tri-n-butylaluminum, tri-n-pentylaluminum, triisooctylaluminum, tri-n-dodecylaluminum, triphenylaluminum, triethylgallium, triphenylgallium, tricyclohexylgallium, tri-n-butylindium, triethylthallium, diethylaluminum hydride, $CH_3AlCl_2$, $(CH_3)_2AlCl$, $C_2H_5AlCl_2$, $(C_2H_5)_2AlCl$, $(C_4H_9)_2AlBr$, $C_8H_{17}AlI_2$, $(C_3H_7)_2GaF$, $(C_6H_{11})_2GaCl$ (cyclohexane derivative), $(C_6H_5)GaBr_2$ (benzene derivative), $$C_{20}H_{41}GaBr_2$$

$(C_{14}H_{29})_2GaF$, $(C_6H_5)_2InCl$ (benzene derivative), $C_8H_{17}InF_2$, $(C_6H_{11})InBr_2$ (cyclohexane derivative), 3-methylcyclohexylaluminum dichloride, 2-cyclohexylethylgallium dichloride, p-tolylberyllium iodide, di(3-phenyl-1-methylpropyl)indium fluoride, 2-(3-isopropylcyclohexyl)ethylthallium dibromide, and the like.

The preferred catalyst system employed in the polymerization comprises (1) a dialkyl aluminum chloride or a mixture of same with a dialkyl aluminum iodide and (2) a titanium trichloride complex, the latter preferably being prepared by reduction of titanium tetrachloride in the presence of aluminum. The preferred aluminum-reduced $TiCl_4$ can be described as being of the composition $TiCl_3 \cdot XAlCl_3$ in which X is a number in the range 0.1 to 1.0. A convenient method for the preparation of such an aluminum-reduced $TiCl_4$ is by reduction of titanium tetrachloride with metallic aluminum to form a complex having the formula $3TiCl_4 \cdot AlCl_3$. This reaction is generally carried out at an elevated temperature, for example, at a temperature in the range 300 to 650° F., preferably 375 to 450° F.

Sufficient diketone is added to the effluent from the polymerization reactor to insure complete chelation of the metallic elements of catalyst. The amount added can range from 1 to 5 times the stoichiometric equivalent of the catalyst present, and generally will be at least 2 times the stoichiometric equivalent.

The diketones suitable for use in the practice of the present invention include alpha-diketones and beta-diketones. These diketones can also be defined as being seelcted from the group consisting of compounds having the formulas:

(1)

and (2)

wherein R and R' are hydrocarbon radicals, such as alkyl, cycloalkyl and aryl. Examples of suitable alpha-diketones include the following:

2,3-butanedione,
2,3-pentanedione,
3,4-hexanedione,
4-methyl-2,3-pentanedione,
3,4-heptanedione,
5-methyl-2,3-hexanedione,
2,5-dimethyl-3,4-hexanedione,
2,2,5,5-tetramethyl-3,4-hexanedione,
1,2-cyclopentanedione,
3-methyl-1,2-cyclopentanedione,
1,2-cyclohexanedione,
bibenzoyl,
bi-2-furoyl,
methylphenylglyoxal,
phenylbenzylglyoxal,
4,4'-dimethyloxybenzil, and the like. The following are examples of suitable beta-diketones:

2,4-pentanedione (acetylacetone),
2,4-hexanedione,
2,4-heptanedione,
5-methyl-2,4-hexanedione,
2,4-octanedione,
5,5-dimethyl-2,4-hexanedione,
3-ethyl-2,4-pentanedione,
3,3-diethyl-2,4-pentanedione,
2,2-dimethyl-3,5-nonanedione,
1-cyclohexyl-1,3-butanedione,
5,5-dimethyl-1,3-cyclohexanedione,
1-phenyl-1,3-butanedione,
1-(4-biphenylyl)-1,3-butanedione,
1-phenyl-1,3-pentanedione,
1-phenyl-5,5-dimethyl-2,4-hexanedione,
1,3-diphenyl-1,3-propanedione,
1,4-diphenyl-1,3-butanedione,
1-phenyl-2-benzyl-1,3-butanedione,
1-phenyl-2-(2-methoxyphenyl)-1,3-propanedione,
1-(4-nitrophenyl)-1,3-butanedione,
1-(2-furyl)-1,3-butanedione,
1-(tetrahydro-2-furyl)-1,3-butanedione, and the like.

Example

A propylene vapor stream flashed from a polypropylene process stream was fed to a two-section gas-liquid contact chamber of 12-inch diameter, and having 4 contacting trays in each section. Each section of the column was equipped with a 270-gallon surge tank. The propylene stream was fed to the gas-liquid contact chamber at a rate of 8,000 pounds per day, which gas stream contained 30 pounds of acetylacetone per day. The inlet stream was delivered to the gas-liquid contact apparatus at 135° F. and 60 p.s.i.g. The extracting dispersions were aluminum hydroxide in kerosene, at a concentration of about 0.75 weight percent aluminum hydroxide, and were pumped through each half of the gas-liquid contact chamber at a rate of 8,000 pounds per day. By analysis of the aluminum content of the slurry, it was determined that 96 percent of the aluminum had been reacted in 48 hours, and the lower portion of the treating process was shut down for filtration and recharging of the slurry inventory of the lower half of the chamber. Sixty five pounds of solid chelate was removed from the filter after filtration of the dispersion from the lower section. Using the same rates, and based upon the analysis of the dispersion in the upper section of the gas-liquid contact chamber, it was determined that the dispersion in the upper chamber would need to be filtered and recharged only once each 24 days, since it contacts acetylacetone-bearing propylene only intermittently while the lower portion of the process is being recharged, except for its action as a final removal system for traces of acetylacetone which may escape the lower section during normal operation.

Reasonable variation and modification are possible within the scope of the foregoing disclosure, the drawing and the appended claims to the invention, the essence of which is that a chelating compound is removed from a stream containing same by contacting the stream with a dispersion of a chelatable metal compound capable of forming a solid chelate with the chelating compound, and filtering the resultant solid chelate from the stream.

I claim:

1. Process for removing a diketone chelating compound from a stream containing same comprising contacting said stream with a trivalent metal compound capable of forming a solid chelate with said chelating compound in a dispersant, filtering said dispersant to remove the chelate thus formed, recharging said filtered dispersant by dispersing fresh said metal compound therein, and returning said filtered and recharged dispersant to further contacting.

2. Process of claim 1 wherein said chelating compound is acetylacetone.

3. Process of claim 2 wherein said stream is vaporous propylene.

4. An apparatus for extraction of an impurity from a vapor stream comprising, in combination, gas-liquid contact means, recirculating means whereby contacted liquid is returned to said gas-liquid contact means, and filtering means whereby contacted liquid is filtered and returned to said gas-liquid contact means, said recirculating means includes an accumulation vessel, a pump, and valve means whereby said contacted liquid is circulated to said gas-liquid contact apparatus when said valve is in one operative position and circulated to said filtering means when said valve is in another operative position.

5. Apparatus of claim 4 wherein said apparatus has a plurality of alternately operable recirculating means.

6. Apparatus of claim 4 wherein said gas-liquid contact means has two sections, arranged for serial flow-through of said stream, each of said sections having recirculating means operable independently of the other recirculating means.

7. Apparatus of claim 6 wherein both recirculating means are operatively connected to a single filtering means.

8. A process according to claim 1 wherein said dispersant is an oil and said trivalent metal compound is selected from iron and aluminum hydroxides.

References Cited
UNITED STATES PATENTS

| 2,252,738 | 10/1938 | Stoever | 55—85 |
| 2,928,817 | 3/1960 | Neal et al. | 260—94.92 |
| 3,125,560 | 4/1964 | Rose | 260—94.92 |

DELBERT E. GANTZ, *Primary Examiner.*

J. D. MYERS, *Assistant Examiner.*